Aug. 23, 1966   W. H. HAINER ETAL   3,268,092
FLOOR MOUNTED MANIPULATOR SUPPORT STRUCTURE
Filed Oct. 18, 1963   3 Sheets-Sheet 1
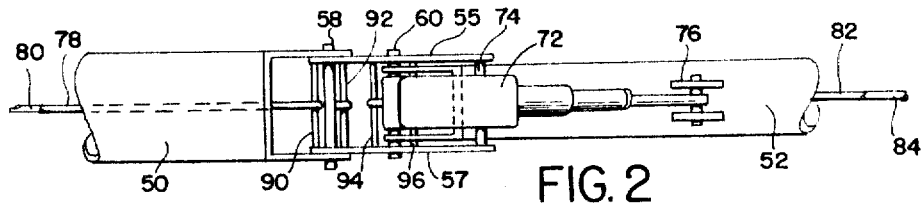
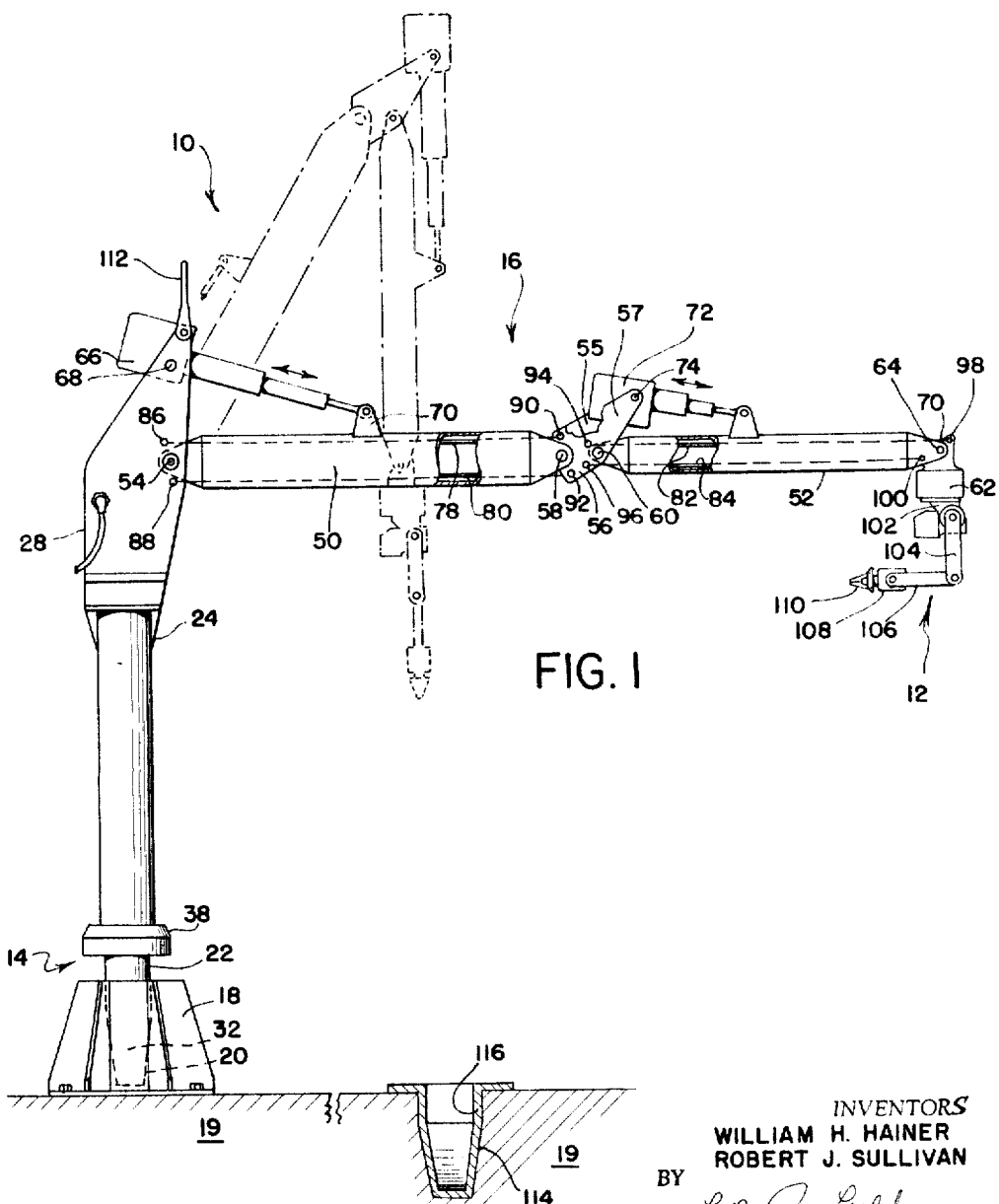
INVENTORS
WILLIAM H. HAINER
ROBERT J. SULLIVAN
BY
*L. McCoy Lillehaugen*
ATTORNEY

INVENTORS
WILLIAM H. HAINER
ROBERT J. SULLIVAN
BY
ATTORNEY

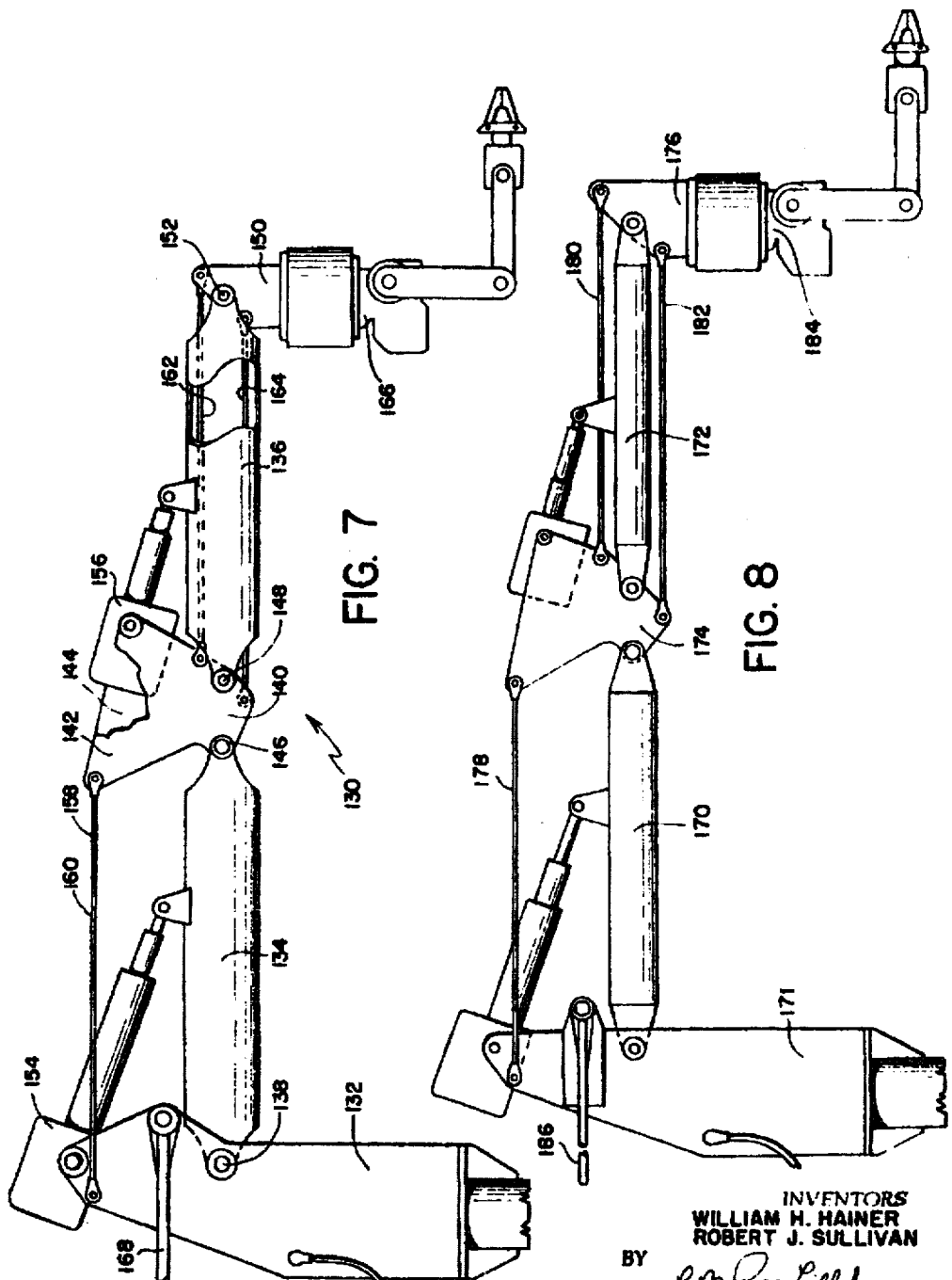

United States Patent Office 3,268,092
Patented August 23, 1966

3,268,092
FLOOR MOUNTED MANIPULATOR SUPPORT STRUCTURE
William H. Hainer, St. Paul, and Robert J. Sullivan, Minneapolis, Minn., assignors to General Mills, Inc., a corporation of Delaware
Filed Oct. 18, 1963, Ser. No. 317,358
13 Claims. (Cl. 214—1)

This invention pertains to a support structure, and more particularly to a floor mounted support structure for use in supporting, positioning and maintaining a material handling unit, such as a remote controlled articulated manipulator, at a desired position within an uninhabitable environment.

The use of mechanical arm manipulators for remote handling of substances or objects in uninhabitable environments, such as areas that are radioactive, toxic, high and low temperature, or vacuum in nature, is well known to those skilled in the art. Manipulators of this type are most commonly attached to a bridge system which is adapted to move along an overhead rail system. Another type of system used in the past, is one in which the manipulator is attached to a vertical bridge or mast which is mounted for movement along a vertical wall mounted rail system. Installation costs for these types of systems are normally quite high because such systems generally require a rail system, structure for supporting the rail system, a movable bridge member, a movable carriage, a cable handling system, or the like.

Accordingly, one object of the present invention is to provide an improved support structure for supporting a material handling unit within a work area.

Another object is to provide a support structure which is mounted on the floor of a work area, and which will position and maintain a material handling unit in a desired position with respect to a workpiece or load within the work area.

A further object is to provide a floor mounted material handling support structure which requires only a small floor area for installation, and which is relatively inexpensive to install and maintain.

A still further object is to provide a manipulator support structure which is simple and rugged in construction, and which can be readily and easily moved from one area to another area within a work cell.

Another object is to provide an improved cantilever boom system for supporting a material handling unit.

Still another object is to provide a folding boom system for supporting an articulated manipulator, the boom system being readily usable with a floor mounted support structure which can be moved from one location to another within a work area.

A further object is to provide a folding boom system which will position and maintain a manipulator at a constant spatial attitude as the boom system is actuated by appropriate actuators.

Other objects and advantages of this invention will become apparent from a consideration of the following specification and drawings. Before proceeding with a detailed description of the invention, however, a brief description of it will be presented.

Preferably, the material handling support structure of the present invention is constructed so that it will position and maintain a crane hoist system, a mechanical arm manipulator unit, or other material handling system, at a desired position with respect to a workpiece or load within a work area. Generally, the support structure includes an elongate support member which is maintained in a vertical position, and a boom system secured to the support member. More specifically, the structure is comprised of an elongate post having one end supported in a floor mounted fixture in such a manner that the post is maintained in a vertical or up-right position. An elongate tubular mast, which circumposes a portion of the post, is rotatably mounted relative to the post. A motor is provided for rotating the mast with respect to the post about the longitudinal axis of the post. A folding cantilever boom system is provided for connecting a material handling unit, such as an articulated manipulator, to the mast. The boom system includes first and second tubular booms. The first tubular boom is pivotally connected at one end to the mast, and a yoke is pivotally connected to the other end of the first boom. The second tubular boom is pivotally connected at one end to the yoke, and a housing is pivotally connected to the other end of the second boom. The housing serves as a mounting member for the manipulator. At least one fixed length rod or arm is associated with each boom for maintaining the yoke and the housing at a constant spatial attitude as the booms are moved, and for counteracting some of the moments caused by the manipulator and load, on the support structure. An actuator is provided for pivoting the first boom relative to the mast, and an actuator is provided for pivoting the second boom relative to the yoke. A lifting bail is provided for permitting the support structure to be lifted and moved to another location within the work area.

The invention will best be understood by reference to the following drawings, wherein:

FIGURE 1 is a side elevational view, with parts broken away, illustrating the floor mounted support structure;

FIGURE 2 is an enlarged partial plan view illustrating a part of the structure shown in FIGURE 1;

FIGURE 7 is a partial side elevational view, with parts broken away, illustrating another embodiment of the cantilever boom system; and FIGURE 8 is a partial side elevational view illustrating a further embodiment of the boom system.

Figure 3:
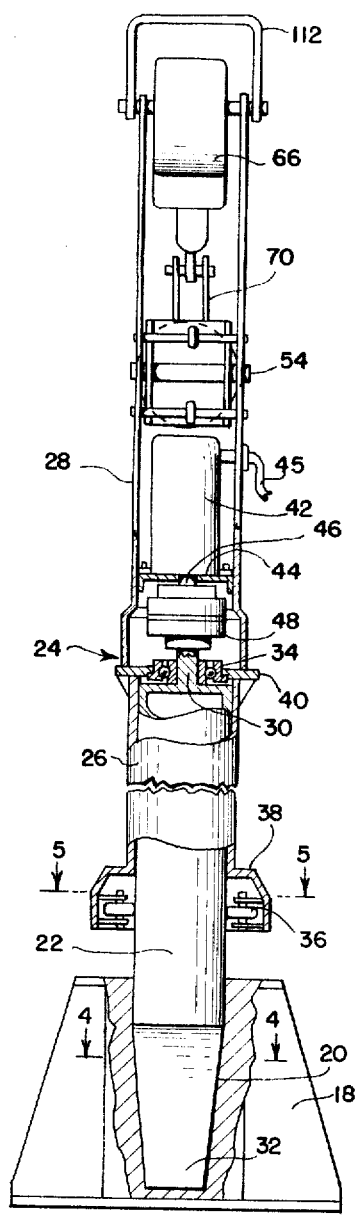
FIGURE 3 is a partial rear view, with parts broken away, illustrating the support structure depicted in FIGURE 1.
Figure 4:
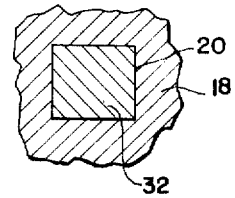
FIGURE 4 is a sectional view taken along line 4—4 of FIGURE 3.
Figure 5:
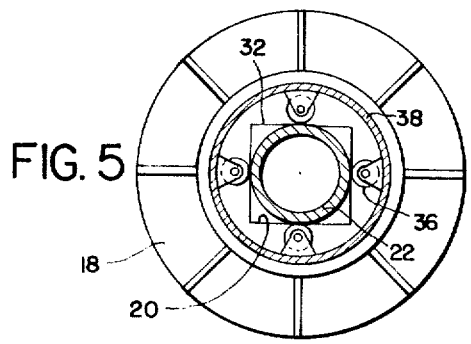
FIGURE 5 is a sectional view taken along line 5—5 of FIGURE 3.

FIGURE 1 illustrates a floor mounted support structure designated generally by reference numeral 10, for supporting and maintaining a material handling unit such as an articulated manipulator 12, at a desired position within a work area or work cell. The support structure 10 includes an elongate vertical support member 14, and a folding cantilever boom system 16 for connecting the manipulator 12 to the vertical support member 14. A fixture 18, having a square shaped socket 20 therein, is secured to the floor 19 of the cell, and the support member 14 is maintained in a vertical position by inserting one of its ends in the socket 20. By using a support structure of this nature, the cell construction can be simplified because no rail system, rail support system, cable handling system, or the like is required, and only a small floor area is required for installation. Moreover, the support structure can easily be incorporated into a cell which includes other equipment such as an overhead rail supported manipulator or a wall mounted manipulator as well.

The vertical support member 14 is comprised of an elongate post 22 and an elongate mast 24. The mast 24 includes a tubular portion 26, and a frame member 28 secured to one end of the tubular portion 26, by appropriate means such as welding. The elongate post 22 is maintained in a vertical position by inserting one of its ends within the socket 20 located in the floor mounted fixture 18. The mast 24 is rotatably mounted with respect to the post 22 by projecting the upper end of the post into the tubular mast so that the longitudinal axis of the mast 24 is coaxial with the longitudinal axis of the post 22, and the mast surrounds the upper end and an intermediate portion of the post 22. The post is provided with a neck 30 at its upper end (note FIGURE 3), and the lower end 32 of the post is shown as having the same cross-sectional shape as the shape of the socket 20, so that it will not rotate with respect to the fixture 18. Note further, that the end 32 is tapered so that it can be readily insered into and withdrawn from the socket 20. The mast is supported relative to the post 22 at its upper end by a bearing 34, retained in a plate 40 so that it encircles the neck 30, and at its lower end by a plurality of guide rollers 36 which ride against the post 22. The rollers 36 are rotatably mounted within a housing 38. The bearing 34 absorbs both radial and thrust loads exerted against the support member 14, whereas the rollers 36 absorb only radial loads.

A motor 42 is attached to the frame member 28 by mounting it on a plate 44, which in turn is secured to the frame member 28. The motor 42 is provided for rotating the mast 24 about its longitudinal axis relative to the post 22. The output shaft 46 of the motor 42 is operatively connected to a clutch 48, which in turn is operatively connected to the neck 30. As the motor 42 is energized, and the shaft 46 rotated, the frame member 28 and the tubular portion 26 of the mast 24 are caused to rotate relative to the post 22. An electrical conduit 45 connects the motor 42 to a power source (not shown). Although the motor 42 is shown attached near the top of the mast 24, it must be realized that it could readily be mounted in some other position as well, and additional gears and/or couplings provided for rotating the mast 24 relative to the post 22. Clutches similar to clutch 48, are well known to those skilled in the art and are commercially available, it will therefore not be described in detail. If desired, additional hardware such as a speed reducer, could be interposed between the motor 42 and the clutch 48.

The boom system 16 includes a first tubular boom 50 and a second tubular boom 52. The first boom 50 is pivotally connected at one end to the frame member 28 by means of a shaft 54. A yoke 56 is pivotally connected to the other end of the boom 50, by means of a shaft 58. The yoke 56 includes a pair of spaced apart plates 55 and 57. The second tubular boom 52 is pivotally connected at one end to the yoke 56 by means of a shaft 60, and a housing 62 is pivotally connected to the other end of the boom 52 by means of a shaft 64.

A first actuator 66 is pivotally attached to the frame member 28 at 68, and it is operatively connected to the boom 50 by attaching it to brackets 70 secured to the boom 50. The actuator 66 imparts pivotal movement of the boom 50 relative to the mast 24, about the longitudinal axis of the shaft 54. A second actuator 72 is pivotally attached to the yoke 56 at 74, and it is operatively connected to the boom 52 by attaching it to brackets 76 secured to the boom 52. The actuator 72 imparts pivotal movement of the boom 52 relative to the yoke 56, about the longitudinal axis of the shaft 60.

Various types of actuators might be used for imparting movement to the booms. For illustrative purposes, telescopic actuators which are projectable and retractable are shown. Actuators of this type are generally well known to those skilled in the art, and they will not be shown or described in detail; one type of such actuator commonly used for example, is a hydraulic actuator.

The yoke 56 and the housing 62 are maintained at a constant spatial attitude as the boom system 16 is actuated, by a number of fixed length rods or arms. A first pair of rods 78 and 80 operatively connect the yoke 56 to the mast 24, and a second pair of rods 82 and 84 operatively connect the housing 62 to the yoke 56. The rods 78 and 80 are positioned within the boom 50, and they are parallel to the longitudinal axis of the boom. The rods 78 and 80 are pivotally connected at one end to the frame member 28 by means of pins 86 and 88 respectively, and at their other end to the yoke 56 by means of pins 90 and 92 respectively. The rods 82 and 84 are pivotally connected at one end to the yoke 56 by means of pins 94 and 96 respectively, and at their other end to the housing 62 by means of pins 98 and 100. By positioning the rods within the booms 50 and 52 as illustrated in FIGURE 1, a relatively compact boom system is provided.

A moment about the shaft 64, caused by the manipulator 12 and its load are counteracted by the rods 82 and 84; the upper rod 82 becomes loaded in tension, whereas the lower rod 84 becomes loaded in compression. The actuator 72 counteracts a moment about shaft 60, caused by the weight of the boom 52, the actuator 72, and the load suspended from the shaft 64. In a like manner, the rods 78 and 80 counteract a moment about the shaft 58; the upper rod 78 becomes loaded in tension, while the lower rod 80 becomes loaded in compression. The actuator 66 counteracts a moment about the shaft 54 caused by the weight of the boom 50, the actuator 66, and the load on the shaft 58. Furthermore, a couple about the longitudinal axis of either boom, caused when certain manipulative tasks are performed by the manipulator 12, is counteracted by the tubular booms 50 and 52, which become loaded in torsion.

A folding boom system of this type is adapted to retract or fold to less than one half of its extended length. In contrast, a telescoping boom system formed by an outer tubular member and an inner member which is projectable out of the outer member and which is movable along the longitudinal axis of the outer member, cannot be retracted to less than one half of its extended length, i.e. less than the length of the outer tubular member.

The manipulator 12 is mounted in the housing 62 and it is adapted to perform various operations. Articulated manipulators of this type are generally well known in the art and will not be described in detail. It is envisioned for example, that the manipulator might include a first portion 102 which is rotatably mounted in the housing 62, an upper arm 104 which is pivotally connected to the portion 102, a lower arm 106 which is pivotally connected to the upper arm 104 to form an elbow, a wrist member 108 pivotally connected to the lower arm 106, and a gripping mechanism 110. The various relative movements are accomplished by means of appropriate actuators, also well known in the art.

A lifting bail 112 is provided for permitting the support structure 10, i.e. the vertical support member 14 and the cantilever boom 16, to be lifted out of the socket 20 in the floor mounted fixture 18, so that it can be moved to and supported in another socket within the work area. Preferably, the lifting bail 112 is located at the center of gravity of the system when the cantilever boom system is folded as shown in dotted lines in FIGURE 1. Positioning of the bail 112 at the center of gravity permits the post 22 to remain substantially vertical as it is lifted out of the socket 20, thereby making it easier to insert the post 22 within a different socket. Lifting and moving the support structure might be accomplished by an overhead crane (not shown in the drawings).

In operation, the articulated manipulator 12 is positionable adjacent to a work piece, and it is adapted to perform numerous manipulative functions. The post 22 is maintained in a vertical position by inserting one end within a floor mounted fixture 18 located within the work area. After the post 22 is supported in the desired socket, the mast 24 can be rotated about the longitudinal axis of the post by energizing the motor 42. The cantilever boom system 16 connects the manipulator 12 to the mast 24. Positioning of the manipulator 12 in a vertical plane is achieved by the folding motion of the boom, and rotation about the mast provides horizontal translation. As illustrated in FIGURE 1 (note the dotted lines), the boom system 16 and more particularly the manipulator 12, can be extended or retracted, raised or lowered, by operating the actuators 66 and 72. The fixed length rods 78, 80, 82 and 84 positioned within the booms 50 and 52, maintain the yoke 56 and the housing 62, and consequently the manipulator 12, at a constant spatial attitude while either the boom 50 or the boom 52 is moved by its respective actuator 66 or 72.

By operating the actuator 66 so that its telescopic members are projected, the boom 50, and more particularly the yoke 56, is lowered. Conversely, when the telescopic members of the actuator 66 are retracted, the yoke 56 is raised. In a like manner, by operating the actuator 72 so that its telescopic members are projected, the boom 52 and more particularly the housing 62 is lowered. Conversely, when the telescopic members of the actuator 72 are retracted, the housing 62 is raised. Note that due to the constant length of the rods 78, 80, 82 and 84, the yoke 56 and the housing 62 are maintained at a constant spatial attitude throughout the entire range of travel.

FIGURE 1 also illustrates another means by which the post 22 can be maintained in a vertical position. If preferred, a socket or hole 114, having substantially the same cross-sectional shape and dimensions as the lower end of the post 22, could be provided in the floor 19 of the work cell. A reinforcing member 116 is also provided for preventing excessive wear on the socket 114.

Figure 6:
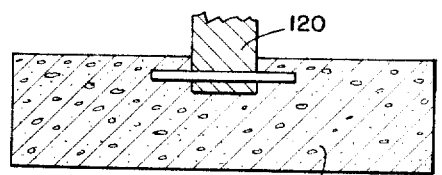
FIGURE 6 is a partial sectional view depicting another way of maintaining the support structure in a vertical position.

FIGURE 6 illustrates another way of maintaining a post 120 in a vertical position. In this embodiment, the lower end of the post 120 is fixedly secured to a weight 122. The weight might be made of lead, concrete, or other similar material, and its size would depend upon the size of the structure being supported and the load to be handled. When the structure is to be moved to a new location, the weight 122 would be moved as well.

FIGURE 7 illustrates another embodiment of the boom system. In this embodiment, a cantilever boom system 130 is pivotally attached to a mast 132, in much the same manner as the pivotal attachment of the cantilever boom system 16 to the mast 24, shown in FIGURE 1. The boom system includes a first tubular boom 134 and a second tubular boom 136. The first tubular boom is pivotally connected at one end to the mast 132 by means of a shaft 138. A yoke 140, which includes a pair of spaced apart plates 142 and 144, is pivotally connected to the other end of the boom 134 by means of a shaft 146. The second tubular boom 136 is pivotally connected at one end to the yoke 140 by means of a shaft 148. A housing 150 is pivotally connected to the other end of the boom 136 by means of a shaft 152. A first actuator 154 is provided for pivoting the boom 134 about the shaft 138, and a second actuator 156 is provided for pivoting the boom 136 about the shaft 148, in substantially the same manner as the actuators 66 and 72 pivot the booms 50 and 52 shown in FIGURE 1.

A pair of parallel fixed length rods or arms 158 and 160 aid in maintaining the yoke 140 at a constant attitude. The rods 158 and 160 are located exteriorly of the tubular boom 134, and they operatively connect the upper part of the yoke 140 to the mast 132. The boom 134 operatively connects the lower part of the yoke 140 to the mast 132. By raising the rods 158 and 160 with respect to the boom 134, the tensile load exerted on these rods is reduced, as compared to the tensile load exerted on the rods 78 shown in FIGURE 1. It should be realized of course, that if desired only a single upper rod could be used for operatively connecting the top of the yoke 140 to the mast 132 in lieu of the rods 158 and 160.

The housing 150 is maintained at a constant attitude as the boom 136 is pivoted about the shaft 148, by a pair of fixed length rods 162 and 164 positioned within the boom 136, said rods being parallel to the longitudinal axis of the boom 136. An articulated manipulator 166, similar to the manipulator 12 shown in FIGURE 1, is connected to the housing 150, and it is adapted to perform manipulative functions within the work cell. A lifting bail 168 secured to the mast 132 is provided for lifting the support structure and moving it about the work area.

FIGURE 8 illustrates another embodiment of the invention, which is similar to the embodiment depicted in FIGURE 7. In this embodiment, the cantilever boom system is attached to a mast 171, and it includes a first tubular boom 170 and a second tubular boom 172. A yoke 174 is pivotally connected to one end of each boom, and a housing 176 is pivotally connected to the second end of the boom 172. The yoke 174 is maintained at a constant attitude by one or more rods 178 and the boom 170; the housing 176 is maintained at a constant attitude by a pair of fixed length rods 180 and 182. Note that the rods 180 and 182 are positioned outside of the tubular boom 172. By positioning all of the rods 178, 180 and 182 outside of the boom 170 and 172, greater loads can be handled without creating excessive tensile loads on the uppermost rod or arm, i.e. rods 178 and 180. An articulated manipulator 184, similar to the manipulator 166, is connected to the housing 176. A lifting bail 186 secured to the mast 171, is provided for lifting the support system and moving it about the work area.

The support structures described hereinbefore are particularly useful for positioning and maintaining a remotely controlled material handling unit, such as an articulated manipulator, at a desired position within an uninhabitable work cell. By supporting the structure in a floor mounted socket, the structure can be readily moved to a new location within the work area by the use of an overhead crane or the like. The support structure requires only a minimum amount of floor area for installation, installation and maintenance costs are relatively low, the structure is simple and rugged in construction, and it does not require a complex rail system, rail support system, cable handling system, or the like to support it. The folding cantilever boom system maintains the material handling unit at a constant spatial attitude as the boom system is actuated, and it can be retracted or folded to less than one half of its extended length.

In the above description and the attached drawings, a disclosure of the principles of the invention is presented together with some of the embodiments by which the invention may be carried out.

What is claimed is:

1. A support structure for supporting a material handling unit within a work area comprising an elongate post supported in a floor mounted socket so that its longitudinal axis is normal to the floor, said socket provided with means for preventing relative rotation between said post and said socket, said post being readily removable from said socket, a tubular member circumposing a portion of said post, means for rotating said tubular member relative to the post about the longitudinal axis of said post, and means for attaching said material handling unit to said tubular member.

2. The combination of claim 1 wherein means is secured to the support structure thereby permitting said structure to be moved to a different location within the work area.

3. A support structure for supporting a material handling unit comprising a floor mounted fixture having a socket therein, an elongate post, the bottom end of said post being supported in said socket in such a manner that the longitudinal axis of said post is maintained in a substantially vertical position, the cross-sectional shape of the bottom end of said post and said socket being such that relative rotation between the two is prevented, a tubular member circumposing a portion of said post, means for rotating said tubular member about the longitudinal axis of the post, and means for attaching said material handling unit to said tubular member.

4. The combination of claim 3 wherein means is secured to the support structure thereby permitting said structure to be removed from said fixture by lifting it out of the socket in said fixture, and thereafter moved to a different location.

5. A portable support structure for supporting a material handling unit within a work area comprising an elongate post, means for maintaining said post in a vertical position, said means including a weighted slab adapted to be positioned on the floor of the work area, means for fixedly securing the lower end of said post to the weighted slab, means secured to the support member thereby permitting said post and said weighted slab to be moved to a different location, a tubular member circumposing a portion of said post, means for rotating said tubular member relative to the post, and means for attaching the material handling unit to the tubular member.

6. A support structure for supporting a material handling unit comprising a floor mounted fixture having a socket therein, means for securing said fixture to the floor, an elongate post supported in said socket so that said post is retained in a substantially vertical position, means for preventing rotational movement of the post relative to the socket, said post being readily removable from said socket, an elongate tubular mast rotatably mounted on said post in such a manner that the upper end of the post projects into said tubular mast and their longitudinal axes are coaxial with each other, means for rotating said mast relative to the post, a frame member attached to the upper end of the mast, a boom system for operatively connecting the material handling unit to the frame member, and means for attaching said boom system to the frame member.

7. A floor mounted material handling unit support structure comprising an elongate post, means including a socket adjacent the floor of the work area for maintaining said post in a vertical position, a tubular mast surrounding the upper end and an intermediate portion of said vertical post, means for rotating said tubular mast about the longitudinal axis of the post, a yoke member, means for operatively connecting said yoke to the mast including a tubular boom and at least one fixed length rod, said boom being substantially larger than the rod, means for pivotally connecting one end of said boom and said rod to the mast, means for pivotally connecting the other end of said boom and said rod to the yoke, means for pivoting said boom and said rod relative to the mast, said yoke being maintained at a constant attitude as said boom and said rod are pivoted, and a material handling unit attached to the yoke.

8. A floor mounted material handling unit support structure comprising an elongate post, means for locating said post on the floor of the work area, said means including means for maintaining said post in a vertical position, a tubular mast circumposing a portion of said post, means for rotating said tubular mast about the longitudinal axis of the post, a folding cantilever boom system including first and second boom members, means for pivotally connecting one end of the first boom to the mast, means for pivoting said first boom relative to the mast, a yoke member pivotally connected to the other end of said first boom, means for maintaining said yoke at a constant spatial attitude as the boom is pivoted, means for pivotally connecting one end of the second boom member to the yoke, means for pivoting said second boom relative to the yoke, a housing pivotally connected to the other end of said second boom, means for maintaining said housing at a constant spatial attitude as said second boom is pivoted, said booms adapted to withstand couples exerted against the support structure, a material handling unit, and means for attaching said unit to the housing.

9. A floor mounted material handling unit support structure comprising an elongate post, means including a floor mounted fixture having a socket therein for maintaining said post in a vertical position, a tubular mast circumposing a portion of said post, means for rotating said tubular mast about the longitudinal axis of the post, a folding cantilever boom system including a first boom member pivotally connected at one end to the mast, a yoke member pivotally connected to the other end of said boom, at least one fixed length rod operatively connecting the yoke to the mast, means for pivoting said first boom relative to the mast, said yoke being maintained at a constant spatial attitude as said boom is pivoted, a second boom member pivotally connected at one end to the yoke, a housing pivotally connected to the other end of said second boom, at least one fixed length rod operatively connecting the housing to the yoke, means for pivoting said second boom member relative to the yoke, said housing being maintained at a constant spatial attitude as said second boom is pivoted, said first and second booms being substantially larger in cross-sectional shape than the rods, a material handling unit, and means for attaching said unit to the housing.

10. A floor mounted material handling unit support structure comprising an elongate post, means for maintaining said post in a vertical position, a tubular mast circumposing a portion of said post, means for rotating said tubular mast about the longitudinal axis of the post, a folding cantilever boom system including first and second tubular boom members, means for pivotally connecting one end of the first boom member to the mast, a yoke member pivotally connected to the other end of said first boom, means for pivotally connecting one end of the second boom member to the yoke member, a housing pivotally connected to the other end of said second boom, means for pivoting said first boom relative to the mast, means for pivoting said second boom relative to the yoke, said boom members adapted to withstand torsional forces exerted against the structure, a pair of fixed length rods positioned within the first boom for operatively connecting the yoke to the mast and for maintaining said yoke at a constant spatial attitude as the first boom is pivoted, a pair of fixed length rods positioned within the second boom for operatively connecting the housing to the yoke and for maintaining said housing at a constant spatial attitude as the second boom is pivoted, a material handling unit, and means for attaching said unit to the housing.

11. A floor mounted material handling unit support structure comprising an elongate post, means for maintaining said post in a vertical position, a tubular mast circumposing a portion of said post, means for rotating said mast about the longitudinal axis of the post, a folding cantilever boom system including a first boom member pivotally connected at one end to the mast, a yoke member pivotally connected to the other end of the boom, at least one fixed length rod located exteriorly of said boom for operatively connecting the yoke to the mast, means for pivoting said first boom relative to the mast, said yoke being maintained at a constant spatial attitude as said boom is pivoted, a second boom member pivotally conncected at one end to the yoke, a housing pivotally connected to the other end of said second boom, means for pivoting said second boom relative to the yoke, a pair of fixed length rods positioned within said second boom for operatively connecting the housing to the yoke, said housing being maintained at a constant spatial attitude as said second boom is pivoted, a material handling unit, and means for attaching said unit to the housing.

12. A floor mounted manipulator support structure comprising an elongate post, means for maintaining said post in a vertical position, a tubular mast circumposing a portion of said post, means for rotating said tubular mast relative to the post, a folding cantilever boom system including a first boom member pivotally connected at one end to the mast, means for pivoting said first boom relative to the mast, a yoke member pivotally connected to the other end of said boom, at least one fixed length rod located exteriorly of said boom for operatively connecting the yoke to the mast, the boom being substantially larger than the rod and adapted to withstand torsional forces exerted against it, said yoke being maintained at a constant spatial attitude as said boom is pivoted, a second boom member pivotally connected at one end to the yoke, means for pivoting said second boom relative to the yoke, a housing pivotally connected to the other end of said second boom, at least one fixed length rod located exteriorly of said boom for operatively connecting the yoke to the housing, the second boom being substantially larger than said rod and adapted to withstand torsional forces exerted against it, said housing being maintained at a constant spatial attitude as the second boom is pivoted, an articulated manipulator, and means for attaching said manipulator to the housing.

13. A portable support structure for supporting a remotely controlled material handling unit on the floor within a work area comprising an elongate post, means for maintaining said post in a vertical position, a tubular member circumposing a portion of said post, said tubular member being rotatable about the longitudinal axis of said post, means for rotating said tubular member, means for attaching the material handling unit to the tubular member, and means secured to the support structure thereby permitting said structure to be moved to a different location on the floor within the work area, said means being secured to the structure substantially at its center of gravity.

References Cited by the Examiner

UNITED STATES PATENTS

| | | | |
|---|---|---|---|
| 1,699,551 | 1/1929 | Travers | 248—415 |
| 2,308,328 | 1/1943 | Despres | 248—415 |
| 2,461,401 | 2/1949 | Trombley | 214—75 |
| 2,674,500 | 4/1954 | Hukari. | |
| 2,846,091 | 8/1958 | Heffner | 214—75 |
| 2,933,205 | 4/1960 | MacDonald et al. | |
| 2,959,301 | 11/1960 | Willsea. | |
| 3,136,432 | 6/1964 | Nicoll | 214—1 |

GERALD M. FORLENZA, *Primary Examiner.*

HUGO O. SCHULZ, *Examiner.*

R. G. SHERIDAN, *Assistant Examiner.*